United States Patent [19]
Liska et al.

[11] Patent Number: 5,880,221
[45] Date of Patent: Mar. 9, 1999

[54] REDISTRIBUTION OF POLYPHENYLENE ETHERS AND POLYPHENYLENE ETHERS WITH NOVEL STRUCTURE

[75] Inventors: Juraj Liska, Bergen op Zoom; Hubertus Adrianus Maria van Aert, Eindhoven; Gert De Wit, Ossendrecht, all of Netherlands

[73] Assignee: General Electric Company, Pittsfield, Mass.

[21] Appl. No.: 800,694

[22] Filed: Feb. 14, 1997

[51] Int. Cl.[6] .............................. C08G 65/48; C08G 65/38
[52] U.S. Cl. ............................................ 525/397; 525/390
[58] Field of Search .................................. 525/390, 397; 528/193, 212, 218

[56] References Cited

U.S. PATENT DOCUMENTS

| | | |
|---|---|---|
| 3,306,874 | 2/1967 | Hay . |
| 3,306,875 | 2/1967 | Hay . |
| 3,367,978 | 2/1968 | White . |
| 3,496,236 | 2/1970 | Cooper et al. . |
| 3,496,239 | 2/1970 | Hamilton et al. . |
| 4,234,706 | 11/1980 | White .................................. 525/390 |
| 4,859,739 | 8/1989 | Yates et al. ............................ 525/92 |
| 5,039,781 | 8/1991 | Neugebauer et al. .................. 528/216 |
| 5,128,422 | 7/1992 | Kowalczik et al. .................... 525/397 |
| 5,315,042 | 5/1994 | Cipullo ................................ 568/727 |

FOREIGN PATENT DOCUMENTS

| | | |
|---|---|---|
| 0 215 257 A1 | 3/1987 | European Pat. Off. . |
| 0315822 | 5/1989 | European Pat. Off. . |
| 0 391 031 A2 | 10/1990 | European Pat. Off. . |
| 0411 423 A2 | 2/1991 | European Pat. Off. . |
| 0 468 162 A1 | 1/1992 | European Pat. Off. . |
| 0 550 209 A2 | 7/1993 | European Pat. Off. . |
| 0 530 442 B1 | 9/1996 | European Pat. Off. . |
| 7-278293 | 10/1995 | Japan . |
| 1119914 | 7/1968 | United Kingdom . |
| WO 96/01865 | 1/1996 | WIPO . |
| WO 9601865A | 1/1996 | WIPO . |

OTHER PUBLICATIONS

XP–002063818—The Synthesis of 4–Hydroxyarylene Ethers by the Equilibration of Phenols with Poly (2,6–dimethyl–1–1, 4–phenylene ether).
A.S. Hay, H.S. Blanchard, G.F. Endres, J.W.Eutace, J.Am.Chem.Soc. 81,6335 (1959).
D.M. White: J. Org. Chem. 34,297 (1969).
C.D. Cooper, A.R. Gilbert, H. Finkbeiner, Polymer Preprints (Am.Chem. Soc., Div. Polym. Chem.)7,166 (1966).
D.A. Bolon Org. Chem. 34, 1584 (1969).
D.M. White: J. Pol.Sci. Part A–1, 9,663 (1971).
D.M. White: Macromolecules 12, No. 5, 1008 (1979).
H.A.M. van Aert et al., Macromolecules 28, 7967 (1995).
H.S.–I Chao and J.M. Whalen: Reactive Polymers 15, 9 (1991).
V. Percec et al.: Makromol. Chem., Macromol. Symp. 54/55,275 (1992).
J.M. Tingerthal et al.: J. Polym. Sci., Part A, Polym. Chem. 25(8) 2043 (1987).
D. Aycock, V. Abolins nd D.M. White, in Encyclopedia of Polymer Science & Engineering, $2^{nd}$ ed., vol. 13, H.F. Mark, N.M. Bikales, C.G. Overberger & G. Menges Eds., Wiley, NY 1988, p.l.
D.M. White, in Comprehensive Polymer Science, vol. 5, G.Allen & J.C. Bevington Eds., Pergamon, Oxford, 1989, p. 473.
James Wang & V. Percec, Phase transer . . ., polymer Bulletin 25, 25–32, 1991).
D. White, Reactions of Poly (phenylene oxide . . .) J. Poly. Sci., 19, 1367–83 (1981).
A.M. Van Aert, Controlled Molecular Weight . . ., JMS–PureAppl. Chem., A32(3), pp. 515–523 (1995).
Roderic P. Quirk Lin–fang Zhu, Anionic synthesis of chain–end . . ., Makromol. Chem. 190, 487–493 (1989).
Herbert S.I. Chao & Jana M. Whalen, Preparation of Poly (2,6–Dimethyl–. . .J. App. Poly. Sci. 49, 1537–46 (1993).
Van Aert, HAM, et al., J. Macromol. Sci., Pure & Appl. Chem,. v. A32 (1995), p. 515.
Akira Mitui, et al., Kobunshi Ronbunshu (1994), 51 (3), 157–66 (Abstract).
Sigeki Takayama et al., Kobunshi Ronbunshu (1994), 51 (7), 479–85.

*Primary Examiner*—Patricia A. Short

[57] ABSTRACT

The present invention deals with the distribution of polyphenylene ethers 1. by reacting the polyphenylene ether in solution with a phenolic compound, wherein special phenolic compounds are used. The redistribution reaction can be performed in toluene or in toluene/alcohol blends. The reaction can be run in the presence or the absence of a catalyst. By using a process for the redistribution of polyphenylene ethers by reacting the polyphenylene ether in solution with a phenolic compound, wherein the polyphenylene ether is reacted with a phenolic compound with formula 3 wherein the phenolic rings are disubstituted with methyl groups or ethyl groups in the ortho positions and the group X is separated from the phenolic ring through at least two carbon atoms and the phenolic compound has a molecular weight of not more than 400 g/mol, preferably not more than 300 g/mol and the redistribution is performed in a mixture of toluene and methanol with 1–30 volume % of methanol or in toluene in the presence of a phase transfer catalyst such as tri (C8–C10 alkyl) methyl ammonium chloride as a promoter; and a diphenoquinone, preferably of 3,3',5,5'-tetramethyl-4,4'-diphenoquinone is used as a catalyst and the molar concentration of the phenolic compound is chosen between 0.9 to 1.1 times the molar quantity of monomeric units in the polyphenylene ether in the reaction solution, more than 90% of the phenolic compound can be incorporated in the polyphenylene.

17 Claims, No Drawings

REDISTRIBUTION OF POLYPHENYLENE ETHERS AND POLYPHENYLENE ETHERS WITH NOVEL STRUCTURE

FIELD OF THE INVENTION

The present invention deals with a process for the redistribution of polyphenylene ethers by reacting the polyphenylene ether in solution with a phenolic compound. The invention further deals with polyphenylene ethers with a novel structure which can be obtained with the process of the invention.

BACKGROUND OF THE INVENTION

The redistribution of polyphenylene ethers by reacting them with phenolic compounds is a well known reaction.

UK 1 119 914 describes the redistribution of polyphenylene ethers with phenolic compounds. In UK 1 119 914 the redistribution is designated by the term equilibration. In the redistribution reaction of polyphenylene ethers with phenolic compound, the polyphenylene ether polymer is usually split into shorter units. The phenolic compound is incorporated in the polyphenylene ether.

It is known to use a variety of phenolic compounds in the redistribution reaction. Similarly various reaction conditions, various catalysts, various polyphenylene ethers and various solvents have been used in the known redistribution reaction.

SUMMARY OF THE INVENTION

The present invention deals with the use of phenolic compounds which have not been used before in the redistribution of polyphenylene ethers. The use of the phenolic compounds of the invention results in novel polymeric or oligomeric polyphenylene ethers with other terminal groups as known before or with other groups incorporated in the chain of the polyphenylene ether as known before. The nature of the terminal group depends on the nature of the phenolic compound, used, particularly when monohydroxyphenolic compounds are used. When dihydroxy functional or multihydroxy functional phenolic compounds are used, new polymers may be formed consisting of two or more polyphenylene ether blocks linked together by the residue of the phenolic compound.

The present invention further aims at optimizing the reaction conditions for the redistribution of polyphenylene ethers. Since polyphenylene ethers are commercially produced in the presence of an organic solvent like toluene, the present invention has focused on the optimization of the redistribution reaction while using toluene as a solvent. Optimal conditions have been found with which it is possible to obtain more than 90% by weight of incorporation of the phenolic compound in the polyphenylene ether.

DESCRIPTION OF THE INVENTION

In the process of the invention for the redistribution of polyphenylene ethers, the polyphenylene ether is reacted in solution with a phenolic compound chosen from the following:

A) phenolic compounds with formula 2

wherein $R_1$ represents a hydrogen-atom or an alkyl group and X represents an allyl group, an amino group, a protected amino group (e.g.protected by a t.butyl carbonate), a carboxyl group, a hydroxy group, an ester group or a thiol group, wherein $R_1$ is an alkyl group when X represents an hydroxy group or an ester group, wherein X may be separated from the phenol ring through an alkyl group and wherein the total number of carbon atoms in the alkyl groups attached to the phenol ring is not more than six;

B) bisphenol compounds with formula 3

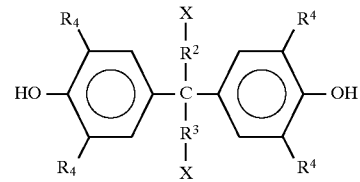

wherein each X, independently of the other X represents a hydrogen atom, an allyl group, an amino group, a protected amino group (e.g.protected by a t.butyl carbonate), a carboxyl group, a hydroxy group, an ester group or a thiol group, with the proviso that not more than one X group represents a hydrogen atom, R2 and R3 represent an hydrogen atom or an alkyl group with 1–6 carbon atoms and each R 4 represents independently of the other R4 a hydrogen atom, a methyl group or an ethyl group; C) a phenolic compound with formula 4 or 5

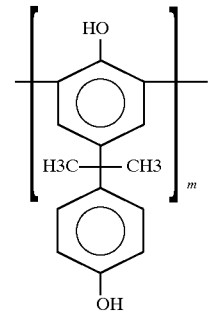

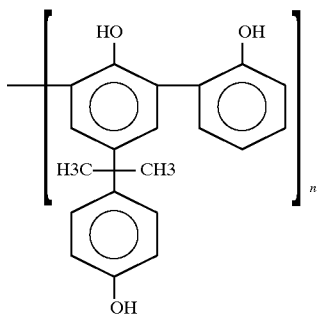

wherein m and n have values from 2–20; D) phenolic compounds with formula 6

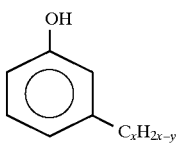

wherein
x has a value of 12–20 and
y has a value of 1–7
or a derivate thereof;

E) multifunctional phenolic compounds with formula 7

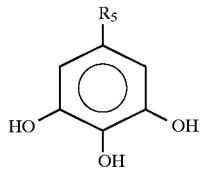

wherein $R_5$ represents a hydrogen atom, an alkyl group, an allyl group, an amino group, a protected amino group (e.g. protected by a t.butyl carbonate), a carboxyl group, a hydroxy group, an ester group or a thiol group; or F) phenolic compounds with amino groups with formula 8

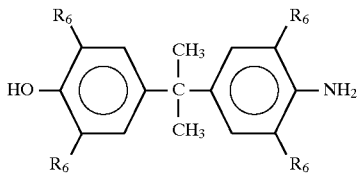

wherein $R_6$ represents independently of one another a hydrogen atom, an alkyl group or a methylene phenol group.

The redistribution is preferably performed in toluene or a toluene/alcohol blend as solvent. The redistribution can be performed in the presence or absence of a catalyst. The preferred catalysts are diphenoquinone compounds like 3,3', 5, 5'-tetramethyl-4,4'-diphenoquinone.

Polyphenylene ethers.

The polyphenylene ethers (PPE) employed in the present invention are known polymers comprising a plurality of structural units of the formula (1)

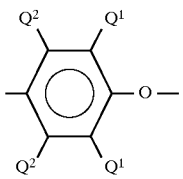

wherein in each structural unit independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units.

Also included are PPE containing moieties prepared by grafting vinyl monomers or polymers such as polystyrenes and elastomers, as well as coupled PPE in which coupling agents such as low molecular weight polycarbonates, quinones, heterocycles and formulas undergo reaction in known manner with the hydroxy groups of two PPE chains to produce a higher molecular weight polymer, provided a substantial proportion of free OH groups remains.

The PPE generally has a number average molecular weight within the range of about 2,000–40,000 and a weight average molecular weight within the range of about 3,000–80,000, as determined by gel permeation chromatography. Its intrinsic viscosity is most often in the range of about 0.05–0.6 dl./g., as measured in chloroform at 25° C. It is possible however to use polyphenylene ethers with higher molecular weights, for example with molecular weights up to 300,000.

The PPE are typically prepared by the oxidative coupling of at least one mono hydroxy aromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful PPE for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the polyphenylene ethers contemplated for use in the present invention include all those presently known, irrespective of variations in structural units or ancillary chemical features.

Phenolic compounds

The present invention deals with the use of different categories of phenolic compounds:

A) phenolic compounds with formula 2

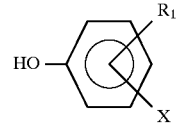

wherein $R_1$ represents a hydrogen-atom or an alkyl group and X represents an allyl group, an amino group, a protected amino group (e.g. protected by a t.butyl carbonate), a carboxyl group, a hydroxy group, an ester group or a thiol group, wherein $R_1$ is an alkyl group when X represents an hydroxy group or an ester group, wherein X may be separated from the phenol ring through an alkyl group and wherein the total number of carbon atoms in the alkyl groups attached to the phenol ring is not more than six.

Suitable examples of phenolic compounds of group A are (4-hydroxyphenyl) acetic acid, (4-hydroxyphenyl) octanoic acid, (4-hydroxylphenyl) propionic acid, methyl esters of the just mentioned acids, tyramine or tyramine in which the amine group has been protected with a tertiary-butyl carbonate, 4-hydroxybenzylalcohol, (4-hydroxy phenyl) ethanol, 2-allyl phenol or 2-allyl-6-methyl phenol.

With this type of phenolic compound it is possible to obtain in a simple way novel polyphenylene ethers with moderate molecular weight and which have reactive end groups. Such polyphenylene ethers can be used for further syntheses or for blending with other ingredients.

B) bisphenol compounds with formula 3

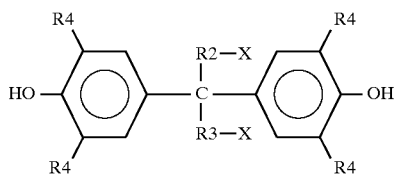

wherein each X, independently of the other X represents an hydrogen atom, an allyl group, an amino group, a protected amino group (e.g.protected by a t.butyl carbonate), a carboxyl group, a hydroxy group, an ester group or a thiol group, with the proviso that not more than one X group represents a hydrogen atom, R2 and R3 represent an hydrogen atom or an alkyl group with 1–6 carbon atoms and each R4 represents independently of the other R4 an hydrogen atom, a methyl group or an ethyl group;

Suitable examples are 4,4'-bis (4-hydroxy phenyl) pentanoic acid; the methyl ester of the just mentioned pentanoic acid; 4,4'-bis (3,5-dimethyl4-hydroxyphenyl) pentanoic acid.

It is preferred that all phenolic rings are double alkylated with two alkyl groups, preferably two methyl groups or two ethyl groups, in ortho position to the phenolic hydroxyl group. This is not only valid for bisphenolic compounds of this group B but for phenolic compounds of all other categories.

The use of the phenolic compounds of this type results in novel polyphenylene ethers which are useful for al kinds of utilization.

C) phenolic compounds with formula 4 or 5

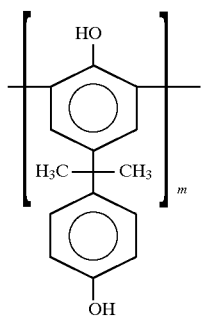

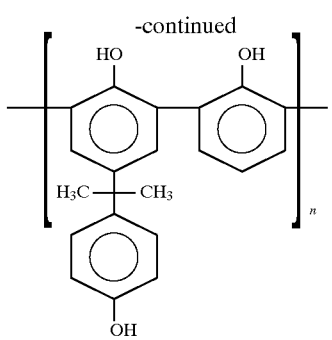

wherein m and n have values from 2–20;

Phenolic compounds with formula 4 and 5 are commercially available products which can be prepared in an environmentally friendly way. The use of the phenolic compounds of this group results in novel polyphenylene ethers which can be used as additive in adhesives, sealants, thermosets, styrenic resins, polyolefines and resin compositions comprising standard PPE.

D) phenolic compounds with formula 6

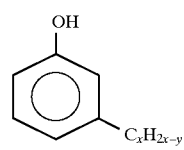

wherein x has a value of 12–20 and y has a value of 1–7 or a derivative thereof;

Examples of phenolic compounds of this group are the commercially available CARDANOL® products. Cardanol® phenolic has the formula 6 wherein x=15 and y= about 3. Cardanol phenolic is in fact a mixture of isomers with 2 double bonds in average. Cardanol phenolic attached to the PPE chain results in soft-segment PPE which improves flow properties of PPE materials as well as compatibility with non-polar components such as polyolefine or rubber components. A few examples of Cardanol phenolic derivatives (produced by Cardolite Corporation) are reactive diluents and flexible resins (e.g. NC-513, NC-514, NC-514 LV), epoxy novolac resins (e.g. NC-547) and phenalkamine curing agents (e.g. NC-540, NC-541, NC-556, NC-558, NC-559, NC-560). An epoxy novolac resin structure is presented below for illustration

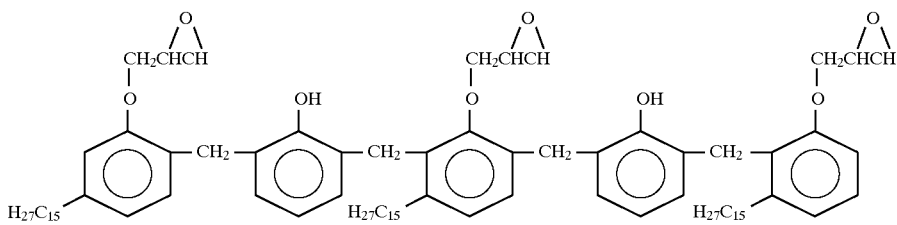

PPE functionalized with this type of phenolic compound can be used for multiple applications in adhesives, sealants, thermosets, styrenic resins, polyolefines, polymer blends, providing improved flow, tack, reactivity, oxidative stability and thermal properties.

E) multifunctional phenolic compounds with formula 7

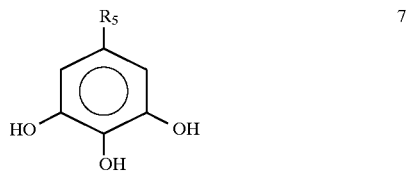

(7)

wherein $R_5$ represents a hydrogen atom, an alkyl group, an allyl group, an amino group, a protected amino group (e.g.protected by a t.butyl carbonate), a carboxyl group, a hydroxy group, an ester group or a thiol group.

Using multifunctional phenolics in PPE redistribution results in branched polymers. For example pyrogallol and its derivatives such as gallic acid or dodecyl-3,4,5-trihydroxybenzoate result in branched PPE when incorporated efficiently during the redistribution Efficient branching/chain extension is demonstrated by molecular weight increase (Example 10) which what is opposite to what would be expected during the redistribution reaction of the prior art. The branched PPE can be used as flow promoter in PPE materials. In the case when R5 would be e.g. carboxylic group, it could be also used in adhesives, sealants, thermosets, etc.

F) phenolic compounds with amino groups with formula 8

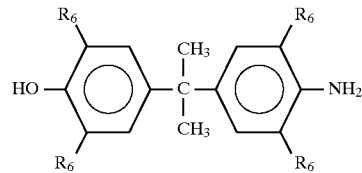

(8)

wherein $R_6$ represent independently of one another a hydrogen atom, an alkyl group or a methylene phenol group.

By using the phenolic compounds of formula 8 it is possible to obtain novel polyphenylene ethers with reactive amino groups. Such novel polyphenylene ethers can be used as additives to adhesives, sealants, thermosets or as compatibilizing additive in polymer blends comprising PPE and other polymers.

The incorporation can be improved by protecting the amino group for example with tertiary butyl carbonate.

Process conditions and other variables

Catalyst

In the redistribution of the invention it is possible to use all kinds of catalysts and/or initiators known to be suitable for the redistribution. Suitable catalysts and/or initiators are peroxides such as benzoyl peroxide, quinone compounds such as 3,3', 5,5'-tetramethyl-1,4-diphenoquinone, complexes containing a transition metal and an amine.

The preferred catalyst is 3,3', 5,5'-tetramethyl-1,4-diphenoquinone. It is also preferred to use diphenoquinone compounds with bulky groups to avoid incorporation of the catalyst in the polyphenylene ether.

Surprisingly it has been found that the presence of a catalyst and/of initiator is not always necessary. It has been found in particular with phenolic compound of type B tested here above that the presence of a catalyst is not required.

The catalyst is preferably used in a quantity of about 0 to 10% by weight with respect to the polyphenylene ether.

Promoter

It has been found that the redistribution can be promoted by a special group of compounds which are commonly described as phase transfer catalysts. This is, in particular, so when polar phenolic compounds are used in the redistribution. All phenolic compounds of claim 1, with exception of those described in part D are polar phenolic compounds. Suitable promoters are ammonium salts like tri (C8–C10 alkyl) methyl ammonium chloride, phosphonium salts, crown ethers, kryptands and polyalkylene ethers.

Solvent

All kinds of solvents known for the redistribution of polyphenylene ethers can be used. The preferred solvent is toluene or a blend of toluene and an alcohol such as methanol. When a blend of toluene and methanol is used the volume ratio of toluene to methanol is chosen between 1: 0.01 and 1:0.5. The concentration of the polyphenylene ether is normally chosen between 1–75% by weight, more preferably 10–40% by weight.

It is possible to use polyphenylene ether solutions which are formed in the generally practiced processes for the preparation of PPE without pretreatment (such as isolation and/or purification). Suitable processes are described in U.S. Pat. No. 3,306,874 and U.S. Pat. No. 3,306,875.

Reaction temperature

The reaction temperature is chosen between 20–150 C, preferably 60–80 C.

Reaction atmosphere

In general, conversions are approximately 20% higher under air compared to nitrogen atmosphere (Example 2 vs 3b). This is probably caused by simultaneous oxidative coupling of phenolics with polyphenylene ether as well as oxidation of the reduced form of TMDQ (biphenol) back to the oxidative form (diphenoquinone). Air should be avoided when using double bond containing phenolics such as 2-allylphenol and/or a peroxide as the catalyst.

Isolation

Two basic options can be used for an isolation of a product after polyphenylene ether redistribution: precipitation or evaporation of a solvent mixture. A reaction product after the redistribution can be isolated by precipitation in a polyphenylene ether non-solvent (e.g. methanol). Functionalized polyphenylene ether oligomers soluble in an non-solvent might be lost by precipitation though. In case when polar phenolics compounds and low molecular weight polyphenylene ethers are used for the redistribution, evaporation is better option. Precipitation is preferred when high molecular weight polyphenylene ethers and low polarity phenolics are used in the redistribution.

Optimal conditions

More than 90% of the phenolic compound was incorporated in the polyphenylene ether under observation of all of the following conditions:

the polyphenylene ether is reacted with a phenolic compound with formula 3 wherein the phenolic rings are disubstituted with methyl groups or ethyl groups in the ortho positions and the group X is separated from the phenolic ring through at least two carbon atoms; and the phenolic compound has a molecular weight of not more than 400 g/mol, preferably not more than 300 g/mol; and the redistribution is performed in a mixture of toluene and methanol with 1–30 volume % of methanol or in toluene in the presence of a phase transfer catalyst such as tri (C8–C10 alkyl) methyl ammonium chloride as a promoter; and a diphenoquinone, preferably of 3,3', 5,5'-tetramethyl-4,4'-diphenoquinone is used as a catalyst; and the molar concentration of the phenolic compound is chosen between 0.9 to 1.1 times the molar quantity of monomeric units in the polyphenylene ether in the reaction solution.

The concentration of the diphenoquinone is preferably 0.8–1.2% by weight of the polyphenylene ether in the solution.

EXAMPLES

Example 1

In this example and all following examples a poly( 2,6-dimethyl-1,4-phenylene ether) (PPE) with differing molecular weights has been used.

30 g of PPE (Mw=46300 g/mol, chloroform, GPC, polystyrene standards) is dissolved in 300 ml toluene under stirring at 60 C. Separately, 3.76 g (5 mol % per PPE) of 4,4'-bis(4-hydroxyphenyl) pentanoic acid (13.15 mmol) is dissolved in 30 ml of methanol and added to the PPE solution. Afterwards, 0.3 g of 3,3',5,5'-tetramethyl-4,4'-diphenoquinone (1.25 mmol) is added and the mixture is reacted for 3 hours with stirring at 60C. Then the reaction mixture is precipitated with 10 fold methanol, filtered, washed and solid polymer vacuum dried at 70C overnight. Average weight molecular weight was 18700 g/mol as determined by GPC and expressed as being polystyrene. Functionality content was determined based on 1H-NMR results. The percentage of the phenol that had actually been incorporated in the polyphenylene ether was calculated. In this case it was: 27%.

The following phenolics were used for PPE redistribution according to this procedure: 4,4'-bis(4-hydroxyphenyl) pentanoic acid (5 mol % per PPE;27%); (4-hydroxyphenyl) acetic acid (10 mol % per PPE;9%); the methyl esters of the above mentioned pentanoic acid (5 mol % per PPE;29%); tyramine (5 mol % per PPE;22%)or tert.-butyl carbonate-protected tyramine (5 mol % per PPE;27%); (4-hydroxyphenyl) ethanol (5 mol % per PPE;35%). The relative quantity of the phenolic compound and the degree of incorporation of the phenol is given above after each phenol between parentheses. The relative amount of toluene to methanol was changed from 10:1 to 9.5:0.5.

By way of comparison it was tried to redistribute PPE with (4-hydroxy phenyl) octanoic acid (10 mol % per PPE; toluene to methanol ratio 9.5:0.5). No incorporation of this phenolic compound in PPE could be detected.

The experiments of this example were repeated with (4-hydroxyphenyl) ethanol (10 mol % per PPE). The relative quantities of toluene and methanol amounted to 9:1. The relative quantity of 3,3', 5,5'-tetramethyl-4,4'-diphenoquinone (TMDQ) was changed for each of the experiments from this series. The resultant percentage of incorporation was measured. The results are shown here below.

| Concentration of TMDQ (gram per 10 gram of PPE) | Weight Percentage of incorporated phenol (%) |
| --- | --- |
| 0.5 | 19 |
| 1 | 26 |
| 2 | 23 |
| 5 | 27 |
| 10 | 23 |

Example 2

10 g of PPE (Mw=56100 g/mol) is dissolved in 100 ml toluene under stirring at 60 C. Separately, 0.74 g of 4,4'-bis (3,5-dimethylfhydroxyphenyl) pentanoic acid (2.14 mmol) is dissolved in 10 ml of methanol and added to the PPE solution. Afterwards, 0.033 g of 3,3',5,5'-tetramethyl-4,4'-diphenoquinone (0.14 mmol) is added. After 1 and 2 hours of reaction time again 0.033 g of TMDQ is added and the mixture is reacted for 3 hours under stirring at 60C. Then the reaction mixture is precipitated with 10 fold methanol, filtered, washed and solid polymer vacuum dried at 70C overnight. Average weight molecular weight was 15800 g/mol as determined by GPC and expressed as being polystyrene. 68% by weight incorporation of the phenolic compound was determined.

Example 3a

The procedure was repeated as in the example 2 only using three times less pentanoic acid derivative. Mw (GPC) was 17700 g/mol. 99% by weight incorporation of the phenolic compound was determined.

Example 3b

The procedure was repeated as in the example 3a only under nitrogen atmosphere instead of air. 80% by weight incorporation of the phenolic compound was determined.

Example 3c (comparative example)

The procedure was repeated as in the example 2 only without using methanol as cosolvent. No redistribution occurred, i.e. no pentanoic acid derivative found in PPE after the reaction. This shows that the use of a solvent blend instead of a sole solvent offers under the reaction conditions of example 2 a clear advantage.

Many of the following examples show however that it is often quite well possible to obtain good results (a high percentage of incorporation of the phenol) without using a cosolvent.

Example 4

30 g of PPE (Mw=56100 g/mol, chloroform, GPC, polystyrene standards) is dissolved in 300 ml toluene under stirring at 60 C. Separately, 0.754 g of 4,4'-bis (3,5-dimethyl-4-hydroxyphenyl) pentanoic acid (2.19 mmol) is dissolved in 15 ml of methanol and added to the PPE solution. Afterwards, 0.3 g of 3,3',5,5'-tetramethyl-4,4'-diphenoquinone (1.25 mmol) is added and the mixture is reacted for 8 hours under stirring at 60C. Then the reaction mixture is split to two parts. First part: solvents are evaporated in a rotary evaporator and solid polymer vacuum dried at 70C overnight. Second part: the reaction mixture is precipitated with 10 fold methanol and vacuum dried. Incorporation was 98% by weight for evaporated sample and 90% for precipitated sample.

Example 5

10 g of PPE (Mw=23300 g/mol, chloroform, GPC, polystyrene standards) is dissolved in 46 ml toluene under stirring at 60 C. Separately, 16.7 g of bisphenol A polymer resin (13.92 mmol) is dissolved in 6 ml of methanol and added to the PPE solution. Afterwards, 0.1 g of 3,3',5,5'-tetramethyl-4,4'-diphenoquinone (0.42 mmol) is added and the mixture is reacted for 5 hours under stirring at 60C. Then the solvents are evaporated in rotary evaporator and solid polymer vacuum dried at 70C overnight. Average weight molecular weight was 20300 g/mol as determined by GPC and expressed as being polystyrene. 25% by weight incorporation of the phenolic compound was determined.

Example 6

10 g of PPE (Mw =46300 g/mol, chloroform, GPC, polystyrene standards) is dissolved in 46 ml toluene under stirring at 60 C. Then 1.2 g of 3-(n-penta-8-decenyl)phenol [Cardanol phenolic] (4 mmol) is added to the PPE solution. Afterwards, 0.1 g of 3,3',5,5'-tetramethyl-4,4'-diphenoquinone (0.42 mmol) is added and the mixture is reacted for 3 hours under stirring at 60C. Then the reaction mixture is precipitated with 10 fold methanol, filtered, washed and solid polymer vacuum dried at 70C overnight. 18% by weight incorporation of the phenolic compound was determined.

The following bulky phenolics were used for PPE redistribution under the reaction conditions of the example 6:

| phenol | incorporation % |
| --- | --- |
| 4-hexyl resorcinol | 20 |
| Cardanol phenolic | 18 |
| vitamin E* | 0 |
| N-(4-hydroxyphenyl)stearamide* | 0 |
| Irganox 3052* | 0 |
| Irganox 565* | 0 |

*Comparative examples.

Examples 7 and 8 demonstrate incorporation of allyl functionality via the redistribution and reactivity of phenolics as dependence on ring alkylation and TMDQ presence.

Example 7

10 g of PPE (Mw =23300 g/mol, chloroform, GPC, polystyrene standards) is dissolved in 46 ml toluene under stirring at 60 C. Afterwards, 0.62 g of 2-allyl-6-methylphenol (4.19 mmol) and 0.1 g of TMDQ (0.42 mmol) are added to the PPE solution and TMDQ the mixture is reacted for 2 hours under nitrogen atmosphere and stirring at 60C. Then the mixture is precipitated with 10 fold of methanol, filtered, washed with methanol and vacuum dried at 70C overnight. Average weight molecular weight was 17000 g/mol as determined by GPC and expressed as being polystyrene. 52% incorporation by weight of the phenolic compound was determined.

Example 7a

The procedure was repeated as in the example 7 only 2-allyl-6-methylphenol was added in three parts each after 1 hour. Mw (GPC) was 17100 g/mol. 43% incorporation by weight of the phenolic compound was determined.

Example 8

The reaction conditions and isolation as in the example 7, only 2-allylphenol was used as the phenolic. Average weight molecular weight was 17300 g/mol as determined by GPC and expressed as being polystyrene. 48% by weight incorporation of the phenolic compound was determined.

Example 8a

The procedure was repeated as in the example 8 only 2-allylphenol was added in three parts each after 1 hour. Mw (GPC) was 18700 g/mol. 39% by weight incorporation of the phenolic compound was determined.

Examples 7b and 8b

The examples 7 and 8 were repeated without using TMDQ. No incorporated phenolics were detected.

Example 9

10 g of PPE (Mw=23300 g/mol, chloroform, GPC, polystyrene standards) is dissolved in 46 ml toluene under stirring at 60 C. Afterwards, 0.95 g of amino-BPA (4.19 mmol) and 0.1 of TMDQ (0.42 mmol) are added to the PPE solution and TMDQ the mixture is reacted for 2 hours under nitrogen atmosphere and stirring at 60C. Then the mixture is precipitated with 10 fold of methanol, filtered, washed with methanol and vacuum dried at 70C. overnight. Average weight molecular weight was 18600 g/mol as determined by GPC and expressed as being polystyrene. 23% by weight incorporation of the phenolic compound was determined.

Example 10

10 g of PPE (Mw=23300 g/mol, chloroform, GPC, polystyrene standards) is dissolved in 46 ml toluene under stirring at 60 C. Afterwards, 0.15 g gallic acid-1-hydrate (0.80 mmol) and 0.1 g of TMDQ (0.42 mmol) are added to the PPE solution and TMDQ the mixture is reacted for 2 hours under nitrogen atmosphere and stirring at 60C. Then the mixture is precipitated with 10 fold of methanol, filtered, washed with methanol and vacuum dried at 70C. overnight. Average weight molecular weight was 35000 g/mol as determined by GPC and expressed as being polystyrene. 42% by weight incorporation of the phenolic compound was determined.

Example 11

10 g of PPE (Mw=46300 g/mol, chloroform, GPC, polystyrene standards) and 0.3g of (4-hydroxyphenyl) benzylalcohol (2.42 mmol) are dissolved in 250 ml toluene under stirring at 20 C. Afterwards, 0.3 g of 3,3',5,5'-tetramethyl-4,4'-diphenoquinone (1.25 mmol) is added and the mixture is reacted for 24 hours under stirring at 20C. Then the reaction mixture is precipitated with 10 fold methanol, filtered, washed and solid polymer vacuum dried at 70C overnight. 27% by weight incorporation of the phenolic compound was determined.

Example 12

The same experiment as in the Example 11 was repeated at 110 C. 20% incorporation of the phenolic compound was determined. Lower molecular weight was found in this case vs Example 12, therefore a larger portion of low molecular weight part of functionalized PPE oligomers was lost via precipitation.

Example 13

10 g of PPE (Mw=46300 g/mol, chloroform, GPC, polystyrene standards) and 0.3g of (4-hydroxyphenyl) benzylalcohol (2.42 mmol) are dissolved in 250 ml toluene under stirring at 110 C. Afterwards, 0.3 g of 3,3',5,5'-tetramethyl-4,4'-diphenoquinone (1.25 mmol) is added and the mixture is reacted for 24 hours under stirring at 110C. Then the reaction mixture is precipitated with 10 fold methanol, filtered, washed and solid polymer vacuum dried at 70C overnight. 4% by weight incorporation of the phenolic compound was determined versus 20% by weight incorporation after 24 hours.

Example 14a 10 g of PPE (Mw=23300 g/mol, chloroform, GPC, polystyrene standards) is dissolved in 46 ml toluene under stirring at 80 C. Afterwards, 0.31g of 4,4'-bis (3,5-dimethyl-4-hydroxyphenyl) pentanoic acid (0.90 mmol) is added to the PPE solution and the mixture is reacted for 6 hours under nitrogen atmosphere with stirring at 80C. Then the solvents are evaporated in a rotary evaporator and solid polymer vacuum dried at 70C. overnight. Average weight molecular Is weight was 29900 g/mol as determined by GPC and expressed as being polystyrene. 56% by weight incorporation of the phenolic compound was determined.

This example demonstrates that it is possible to do the redistribution reaction in the absence of a catalyst.

Example 14b 20 g of PPE (Mw=23300 g/mol, chloroform, GPC, polystyrene standards) is dissolved in 46 ml toluene under stirring at 80 C. Afterwards, 0.6 g of 4,4'-bis (3,5-dimethyl-4-hydroxyphenyl) pentanoic acid (1.73 mmol) and 0.2 g TMDQ (0.84 mmol) are added to the PPE solution and the mixture is reacted for 6 hours under nitrogen atmosphere with stirring at 80C. Then the solvents are evaporated in a rotary evaporator and solid polymer vacuum dried at 70C overnight. Average weight molecular weight was 19200 g/mol as determined by GPC and expressed as being polystyrene. 71% by weight incorporation of the phenolic compound was determined.

Example 14c 20 g of PPE (Mw=23300 g/mol, chloroform, GPC, polystyrene standards) is dissolved in 46 ml toluene under stirring at 80 C. Afterwards, 0.6 g of 4,4'-bis (3,5-dimethyl4-hydroxyphenyl) pentanoic acid (1.73 mmol), 0.2 g of tri (C8–C10 alkyl)-methyl ammonium chloride and 0.2 g TMDQ (0.84 mmol) are added to the PPE solution and the mixture is reacted for 6 hours under nitrogen atmosphere with stirring at 80C. Then the solvents are evaporated in a rotary evaporator and solid polymer vacuum dried at 70C overnight. Average weight molecular weight was 17800 g/mol as determined by GPC and expressed as being polystyrene. 94% by weight incorporation of the phenolic compound was determined.

This example demonstrates that it is possible to use a phase transfer catalyst like tri(C8–C10alkyl)-methyl ammonium chloride instead of TMDQ.

Example 15

PPE was polymerized from 2,6-dimethylphenol in toluene, catalyzed by copper/amine complex in the presence of oxygen according to generally known procedures. The obtained mixture contained 20 wt % of PPE polymer, 1 wt % 3,3',5,5'-tetramethyl-4,4'-diphenoquinone and water (side products) and components of the catalytic system. 1 mol % of 4,4'-bis(3,5-dimethyl4-hydroxyphenyl) pentanoic acid per PPE was added to the reaction mixture and reacted for 5 hours at 80C. under nitrogen. Then the reaction mixture is precipitated with 10 fold methanol, filtered, washed and solid polymer vacuum dried at 70C. overnight. Incorporation of the phenolic was 94% by weight.

This example demonstrates the possibility to use the PPE solution in the form as it is obtained from a commercial reaction without any pretreatment or isolation of the PPE.

All patents mentioned in this patent application are herewith incorporated by reference.

We claim:

1. A process for the redistribution of polyphenylene ethers by reacting the polyphenylene ether in solution with a phenolic compound of the formula:

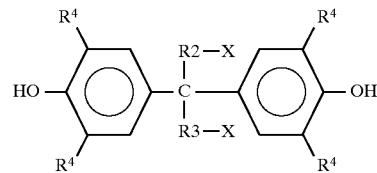

wherein each X independently represents a hydrogen atom, an allyl group, an amino group, a protected amino group, a carboxyl group, a hydroxy group, an ester group or a thiol group, with the proviso that not more than one X group represents a hydrogen atom, each $R^1$ independently represents a methyl group or an ethyl group, $R^2$ and $R^3$ independently represents an alkylene group with 1–6 carbon atoms with the proviso that one of $R^2$—X and $R^3$—X can be a hydrogen atom, and wherein the phenolic compound has a molecular weight of not more than 400 g/mol; and wherein the redistribution is performed in toluene or in a mixture of toluene containing 1 to 30 volume percent of methanol; and wherein the process contains a phase transfer catalyst and a diphenoquinone;

wherein the molar concentration of the phenolic compound is between 0.9 to 1.1 times the molar quantity of monomeric units in the polyphenylene ether in the reaction solution.

2. The process of claim 1, wherein the redistribution is performed in the presence of 0.8–1.2% by weight of 3,3',5, 5'-tetramethyl-4,4'-diphenoquione, calculated with respect of the quantity by weight of polyphenylene ether in the solution.

3. A process for the redistribution of polyphenylene ethers by reacting the polyphenylene ether in solution with a phenolic compound, wherein the phenolic compound is selected from the group consisting of:

(a) bisphenol compounds of the formula:

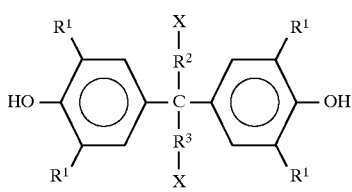

wherein each X independently represents a hydrogen atom, an allyl group, an amino group, a protected amino group, a carboxyl group, a hydroxy group, an ester group or a thiol group, with the proviso that not more than one X group represents a hydrogen atom, each $R^1$ independently represents a methyl group or an ethyl group, $R^2$ and $R^3$ independently represents an alkylene group with 1–6 carbon atoms with the proviso that one of $R^2$—X and $R^3$—X can be a hydrogen atom;

(b) phenolic compounds of the with formulas

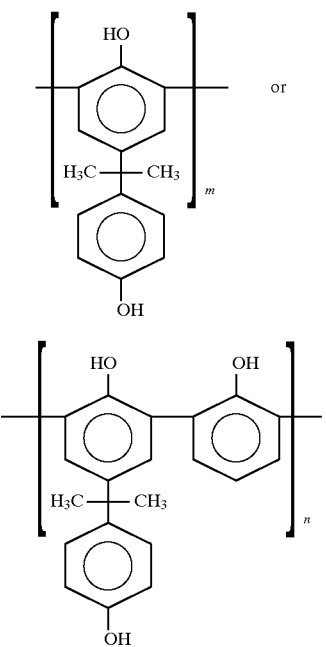

wherein m and n have values from 2–20;

(c) phenolic compounds of the formula:

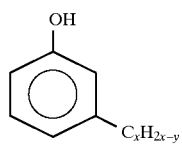

wherein x has a value of 12–20 and y has a value of 1–7;

(d) multifunctional phenolic compounds of the formula:

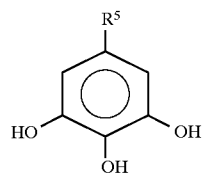

wherein $R^5$ represents a hydrogen atom, an alkyl group, an allyl group, an amino group, a protected amino group, a carboxyl group, a hydroxy group, an ester group or a thiol group; and (e) phenolic compounds of the formula:

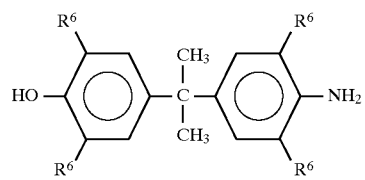

wherein $R^6$ represent independently of one another a hydrogen atom, an alkyl group or a methylene phenol group.

4. The process of claim 3, wherein the phenolic compound is a bisphenolic of the formula:

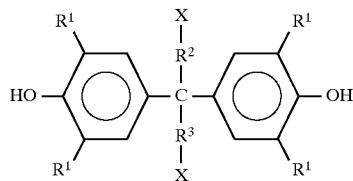

wherein each $R^1$ represents a methyl group, $R^2$ and $R^3$ each represent an alkyl group of not more than four carbon atoms, and X represents a carboxyl group or a hydroxyl group.

5. The process of claim 3, wherein the redistribution is performed in toluene or a toluene/alcohol blend.

6. The process of claim 5, wherein the redistribution is performed in the presence of a diphenoquinone catalyst in a quantity up to 10% by weight with respect to the quantity of polyphenylene ether.

7. The process of claim 3, wherein the concentration of the polyphenylene ether in the solution is between 1–75% by weight.

8. The process of claim 3, wherein the solvent is a mixture of toluene and methanol in a volume ratio of toluene to methanol between 1:0.01 to 1:0.5.

9. The process of claim 3, wherein the redistribution is performed in the presence of a promoter that is a phase transfer catalyst.

10. The process of claim 9, wherein the phase transfer catalyst is selected from the group consisting of tri($C_8$–$C_{10}$ alkyl) methyl ammonium chloride, phosphonium salts, crown ethers, kryptands, and polyalkylene ethers.

11. The process of claim 3, wherein the phenolic compound is a bisphenol compounds of the formula:

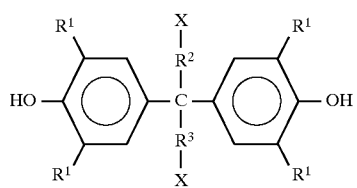

wherein each X independently represents a hydrogen atom, an allyl group, an amino group, a protected amino group, a carboxyl group, a hydroxy group, an ester group or a thiol group, with the proviso that not more than one X group represents a hydrogen atom, each $R^1$ independently represents a methyl group or an ethyl group, $R^2$ and $R^3$ independently represents an alkylene group with 1–6 carbon atoms with the proviso that one of $R^2$—X and $R^3$—X can be a hydrogen atom.

12. The process of claim 3, wherein the phenolic compound is a phenolic compound of the formulas

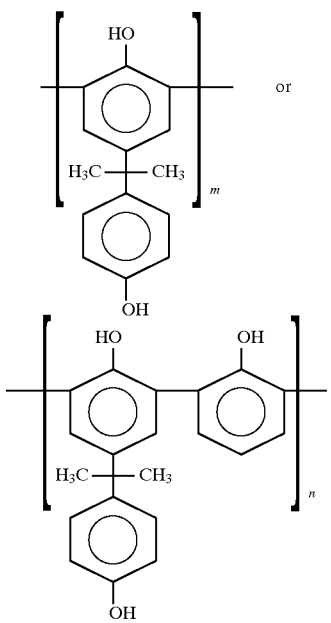

wherein m and n have values from 2–20.

13. The process of claim 3, wherein the phenolic compound is a phenolic compound of the formula:

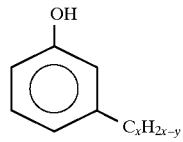

wherein x has a value of 12–20 and y has a value of 1–7.

14. The process of claim 3, wherein the phenolic compound is multifunctional phenolic compounds of the formula:

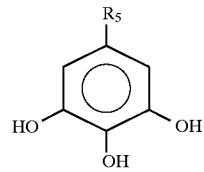

wherein $R^5$ represents a hydrogen atom, an alkyl group, an allyl group, an amino group, a protected amino group, a carboxyl group, a hydroxy group, an ester group or a thiol group.

15. The process of claim 3, wherein the phenolic compound is phenolic compound of the formula:

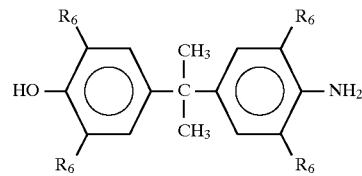

wherein $R^6$ represent independently of one another a hydrogen atom, an alkyl group or a methylene phenol group.

16. The process of claim 3, wherein the phenolic compound is 4,4'-(bis(4-hydroxyphenyl) pentanoic acid or derivative of the acid.

17. The polyphenylene ether made by the process of claim 3.

* * * * *